(12) United States Patent
Sauerwein (10) Patent No.: US 8,878,620 B2
(45) Date of Patent: Nov. 4, 2014

(54) PHASE COHERENT PLAYBACK IN AND ARBITRARY WAVEFORM GENERATOR

(75) Inventor: Timothy E. Sauerwein, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 66 days.

(21) Appl. No.: 13/593,948

(22) Filed: Aug. 24, 2012

(65) Prior Publication Data

US 2014/0053709 A1 Feb. 27, 2014

(51) Int. Cl.
H03B 5/00 (2006.01)
(52) U.S. Cl.
USPC .......................................................... 331/172
(58) Field of Classification Search
USPC .......................................................... 331/172
See application file for complete search history.

(56) References Cited

U.S. PATENT DOCUMENTS

| | | | | |
|---|---|---|---|---|
| 2,856,530 A * | 10/1958 | Watson | .......................... | 331/171 |
| 3,289,082 A * | 11/1966 | Shumate | ........................ | 375/261 |
| 3,458,835 A * | 7/1969 | Saeger | ........................... | 332/101 |
| 4,253,187 A * | 2/1981 | Geise et al. | .................... | 375/361 |
| 4,872,146 A * | 10/1989 | Farmer et al. | .................... | 367/87 |
| 5,261,035 A * | 11/1993 | Adler | ............................... | 706/38 |
| 6,066,967 A * | 5/2000 | Cahill et al. | ................... | 327/107 |
| 6,320,920 B1 * | 11/2001 | Beyke | ........................... | 375/350 |
| 6,662,321 B1 * | 12/2003 | Collin | ........................... | 714/701 |
| 7,072,781 B1 * | 7/2006 | Gershon et al. | ................. | 702/63 |
| 7,271,575 B2 * | 9/2007 | Pickerd et al. | ............. | 324/76.19 |
| 7,440,987 B1 * | 10/2008 | Song et al. | ..................... | 708/276 |
| 7,480,688 B2 * | 1/2009 | Meckley et al. | .............. | 708/271 |
| 7,714,623 B2 * | 5/2010 | Reilly et al. | .................. | 327/105 |
| 2004/0027138 A1 * | 2/2004 | Pickerd et al. | ................ | 324/646 |
| 2006/0159201 A1 * | 7/2006 | Blasco Claret et al. | ........ | 375/330 |
| 2008/0005213 A1 * | 1/2008 | Holtzman | ...................... | 708/276 |
| 2009/0256640 A1 * | 10/2009 | Reilly et al. | .................... | 331/45 |

* cited by examiner

*Primary Examiner* — David S. Warren
(74) *Attorney, Agent, or Firm* — Francis I. Gray; Marger Johnson & McCollom PC (57) ABSTRACT

An improved arbitrary waveform generator has a waveform memory for storing digitized waveforms, a waveform playout for playing out desired ones of the digitized waveforms as analog waveforms and a sequencer for controlling the waveform playout, the sequencer providing indications of the desired waveform for playout and a desired starting sample position for the desired waveform. The sequencer includes a tracking mechanism for the desired waveform so that the desired waveform is phase coherent when playout is interrupted and restarted later according to programming of the sequencer.

7 Claims, 7 Drawing Sheets

| Table E1 - Waveforms | | |
|---|---|---|
| Identification | Description | Length |
| E3 | Digitized samples of the waveform 41, giving one cycle from the generator 40 | $N_{E3}$ |
| E4 | Digitized samples, each of which is zero | $N_{E4}$ |

| Table E2 - Sequencer Program | | |
|---|---|---|
| Step | Play Waveform | Exit Condition |
| E5 | E3 | When Event $t_1$ occurs, go to step E6 |
| E6 | E4 | When Event $t_2$ occurs, go to step E7 and start coherently |
| E7 | E3 | None |

PHASE COHERENT PLAYBACK IN AND ARBITRARY WAVEFORM GENERATOR

BACKGROUND OF THE INVENTION

The current invention relates to arbitrary waveform generators for playing back stored waveforms, and more particularly to phase coherent playbacks of stored waveforms when switching between different stored waveforms.

Arbitrary waveform generators (AWG), such as the AWG7000 series manufactured by Tektronix, Inc. of Beaverton, Oreg., use a digital-to-analog (D/A) converter to play out waveforms that are stored digitally in a memory. The AWG provides various methods for switching playout on and off, and for switching between waveforms.

Figure 1:
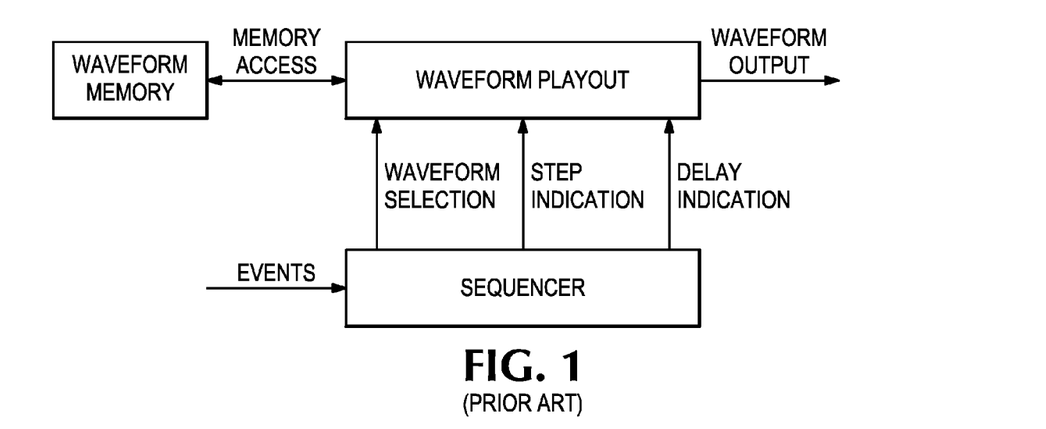
FIG. 1 is a block diagram view of an arbitrary waveform generator (AWG) according to the prior art.

FIG. 1 shows a block diagram view of a portion of an AWG according to the prior art. A waveform memory stores information for a plurality of waveforms. For each waveform the waveform memory stores an ordered set of digitized samples that correspond to that particular waveform. A waveform playout system reads portions of the ordered sets of digitized samples from the waveform memory over a memory access connection. The waveform playout system uses techniques, which are well known to those skilled in the art, for reading efficiently from the waveform memory, such as reading several digitized samples in a single parallel operation. The waveform memory is organized in a special way to support such efficient reading, as is well known in the art.

The waveform playout system produces an output analog voltage from a D/A converter on a waveform output line by repeatedly converting the digitized samples into output analog voltage levels. The rate of this conversion is given by an output sample rate, R, which is a number measured in samples per second, and which is a parameter of operation of the waveform playout system. The parameter, R, typically may be altered by a user of the AWG. The rate at which the waveform playout system uses the memory access connection to access the waveform memory is not necessarily the same as R. All that is required is that, on average, the waveform playout system obtains digitized samples from the memory at a higher rate than the rate needed to produce the waveform output, as is well known in the art.

Figure 2:
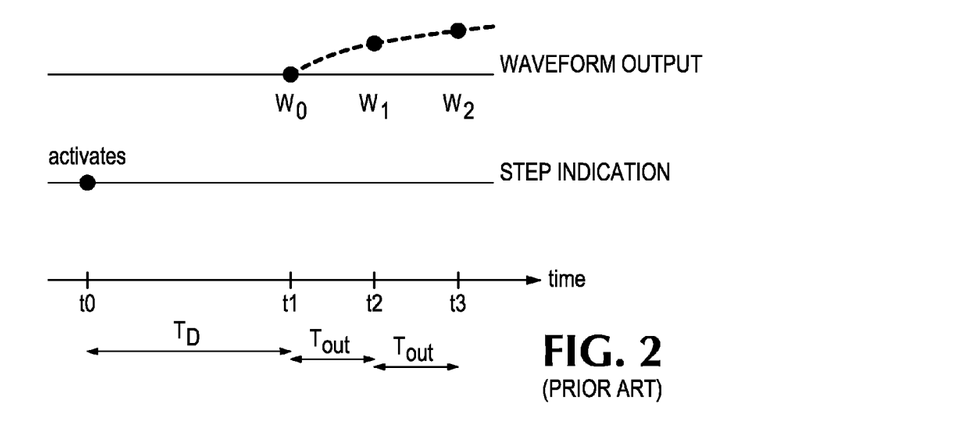
FIG. 2 is a timing diagram view illustrating the operation of the AWG of FIG. 1.

The operation of the waveform playout system is further governed by a sequencer, as described below. FIG. 2 shows a timing diagram for the AWG of FIG. 1 to illustrate a typical operation of the AWG. The sequencer interacts with the waveform playout system by activating a step indication at a moment in time, t0. At time, t0, the sequencer also sends to the waveform playout system two additional items of information: (1) a waveform selection which selects the waveform to begin playing next; and (2) a delay indicator which specifies a time delay, Td. From these three items of information, the waveform playout system is instructed to begin playing the selected waveform starting at time Td after t0. In this typical example, the first three digitized samples of the selected waveform are w0, w1 and w2. At time t1, which equals time t0 plus Td, the waveform playout system produces an analog voltage level on the waveform output by converting the digitized sample, w0, to the corresponding voltage value. The reciprocal of the output sample rate, R, is a time Tout, which is the waveform output sample period. Time t2 is time t1 plus the output sample period Tout. At time t2 the waveform playout system produces an analog voltage level at the waveform output corresponding to digitized sample w1, etc. Continuing in this manner, the waveform playout system produces a time varying voltage on the waveform output line by converting the digitized samples of the selected waveform in sequence to the corresponding voltages at the output sample rate, R.

The time delay, Td, is provided because the mechanism by which the waveform playout system accesses the waveform memory requires time to adjust from one waveform to another after receiving the step indication from the sequencer. The time delay also allows the sequencer to align with greater resolution the time of playout change with the detailed timing behaviors of event inputs supplied to the sequencer.

As a result of the mechanism described above, the sequencer is able to instruct the waveform playout system to begin playout of the waveforms that the sequencer selects, such playouts beginning at times which the sequencer selects. In a typical AWG the sequencer may be controlled by a user-supplied program, and may engage in behaviors such as (1) selecting particular waveforms in a user-specified order, (2) repeating a waveform for a user-specified number of cycles, (3) making decisions based on the behavior of event inputs, (4) making decisions based on moments in time when the behaviors of the event inputs occur, and (5) various combinations of these behaviors, as is well known in the art and represented in commercially available products.

Figure 3:
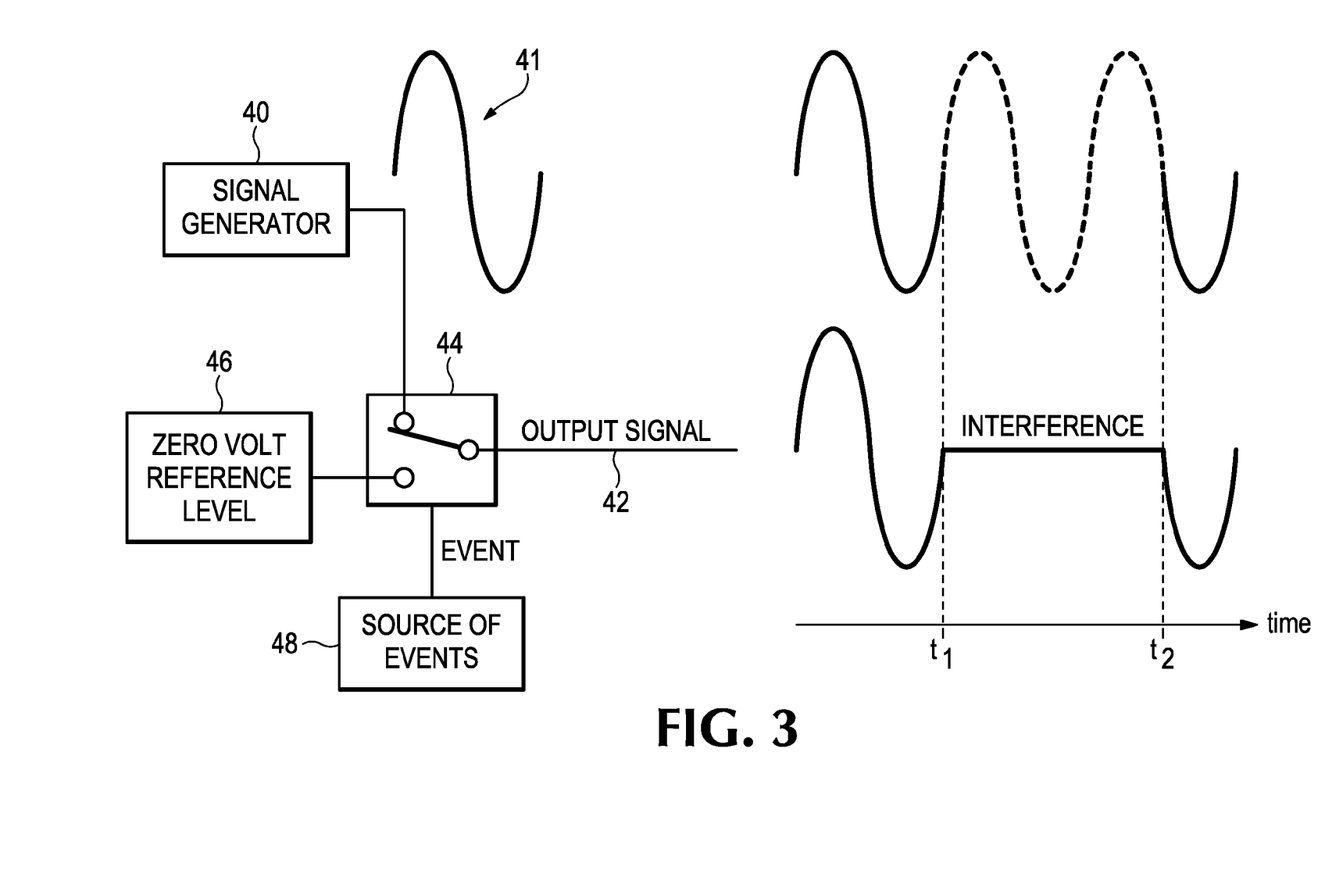
FIG. 3 is a block diagram/timing diagram view illustrating phase coherence of a test signal in a real environment.

AWGs are used in the test and measurement environment to simulate a real life situation for testing various devices. For example, a test signal from an AWG, such as a wireless communication signal, may be used to test the operation of a cellular telephone. In a real environment the wireless communication signal may be interrupted by some form of interference, such as electrical or physical interference. Electrical interference may take the form of a radiated signal that swamps the wireless communication signal. Physical interference may take the form of a building or terrain that temporarily blocks the wireless communication signal. However, the wireless communication signal continues to transmit even though the signal is not being received. When the interference is removed, the received wireless communication signal has phase coherence with the wireless communication signal prior to the interference. FIG. 3 illustrates this where the signal generator provides the wireless communication signal, represented by a sine wave, and a zero level voltage source which represents interference. The switch determines when interference occurs, and the waveforms show how the sine signal continues during the period that the zero level is being transmitted so that, when the zero level is removed, the sine signal has phase coherence with the sine signal that existed prior to the "interference."

Figure 4:
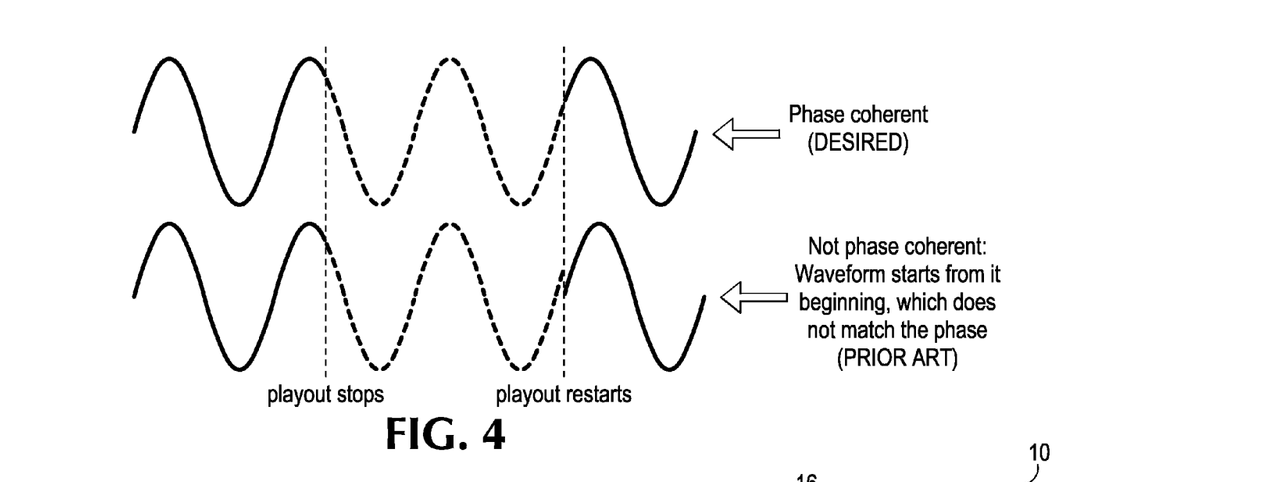
FIG. 4 is a timing diagram view illustrating the difference between phase coherent and non-phase coherent playback of waveforms.

When switching between waveforms in the waveform memory, current practice is for the AWG to start at the beginning of each new waveform, i.e., the waveform playout system always starts the waveform playout with digitized sample w0. However, sometimes the user wants the switching to be phase coherent to simulate a wireless communication signal, as discussed above, which means that the output waveforms should behave as though the waveform is being switched between generators that are synchronized with each other, i.e., the generators are always playing, rather than as though the switching operation resets the generator. FIG. 4 is a timing diagram illustrating the difference between a desired phase coherent waveform output and a waveform output according to the prior art.

What is desired is a phase coherent playback in an arbitrary waveform generator when switching between waveforms to a previously selected waveform.

BRIEF SUMMARY OF THE INVENTION

Accordingly, the present invention provides for phase coherent playback in an arbitrary waveform generator when switching between waveforms to a previously selected waveform. The arbitrary waveform generator has a waveform memory for storing data samples representing multiple waveforms, a waveform playout for playing out the multiple waveforms from the waveform memory as analog waveforms, and a sequencer for controlling the waveform playout by providing a waveform selection indication, a step indication and a delay indication so the waveform playout plays out a selected one of the multiple waveforms from the waveform memory according to a desired event. Additionally the arbitrary waveform generator provides a waveform starting position indication from the sequencer to the waveform playout, the waveform starting position indication tracking a conceptual data sample position within the data samples for the selected one of the multiple waveforms, the data samples for the selected one of the multiple waveforms being tracked by the sequencer to produce phase coherence of the selected one of the multiple waveforms when played out again by the waveform playout according to the desired event. To generate the waveform starting position indication, the sequencer has a clock generator for providing a clock signal at a desired playout rate, and a counter having as inputs the clock signal from the clock generator and a modulus representing a number of data samples for the selected one of the multiple waveforms. The counter continuously counts pulses of the clock signal from zero to (modulus−1) to produce an offset signal to the sequencer that tracks the conceptual data sample position within the selected one of the multiple waveforms. The sequencer generates the waveform starting position indication from the offset signal when the selected one of the multiple waveforms is played out by the waveform playout again according to the desired event.

The objects, advantages and other special features of the present invention are apparent from the following detailed description when read in conjunction with the attached drawing figures and appended claims.

DETAILED DESCRIPTION OF THE INVENTION

The present invention has two parts: (1) adding an indication of a waveform starting position that is provided by a sequencer to a waveform playout in an arbitrary waveform generator (AWG); and (2) adding to the sequencer a means of tracking the phase of a previously output waveform to achieve phase coherence when the waveform playout returns to the previously output waveform.

Figure 5:
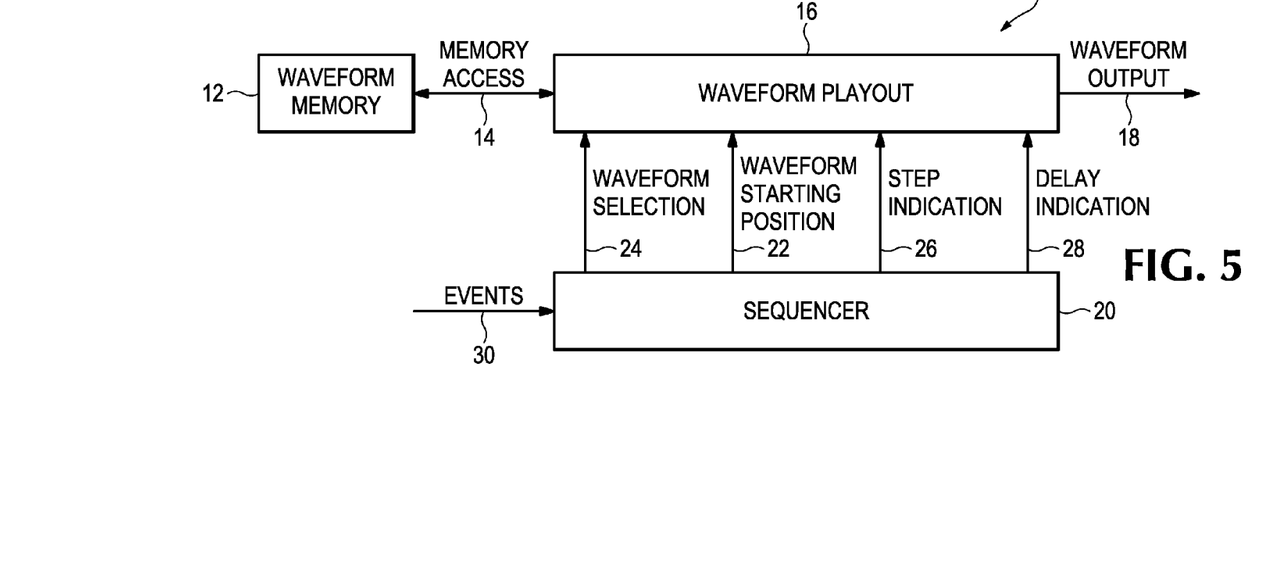
FIG. 5 is a block diagram view of an AWG according to the present invention.

Referring now to FIG. 5 an AWG 10, as modified by the present invention, is shown. A waveform memory 12 provides digitized sets of waveform data over a memory access connection 14 to a waveform playout 16, which provides an analog waveform output 18. A sequencer 20 is modified to add a waveform starting position indicator 22 together with a waveform selection indicator 24, a step indication 26 and a delay indication 28, all of which are provided to the waveform playout 16 by the sequencer 20. The sequencer 20 is controlled according to event inputs 30, as in the prior art. The waveform starting position indicator 22 indicates the starting position within the waveform that is to be played out by the waveform playout 16.

Instead of beginning with a digitized sample, w0, of a selected waveform as in the prior art described above, the waveform playout 16 begins with a sample, Wn, where "n" is the content of the waveform starting position indicator 22 provided to the waveform playout by the sequencer 20. In other words, the waveform playout 16 does not begin playing the waveform from the waveform memory 12 at the waveform's beginning, but at an offset from the beginning of the waveform as indicated by the waveform starting position indicator 22.

Referring back to FIG. 3, the usefulness of the present invention is illustrated. A signal generator 40 generates a signal, as shown by the graph to the right, which is multiple iterations of one cycle of the waveform 41 output by the signal generator. An output signal 42 is derived from a switch 44 that selects between the output of the signal generator 40 and the output of a zero volt reference level source 46 (which may be another signal generator or another waveform within the signal generator representing, for example, interference in a wireless communication signal as discussed above). The switch 44 is controlled by events from a source of events 48. Initially the switch 44 is set to select the signal generator 40. At time t1 the source of events 48 generates an event that changes the switch 44 to select the zero volt reference level source 46. At time t2 another event from the source of events 48 causes the switch 44 to again select the output from the signal generator 40, which output is phase coherent since the signal generator is running constantly, as shown in the graph representing the output signal 42.

Figure 6:
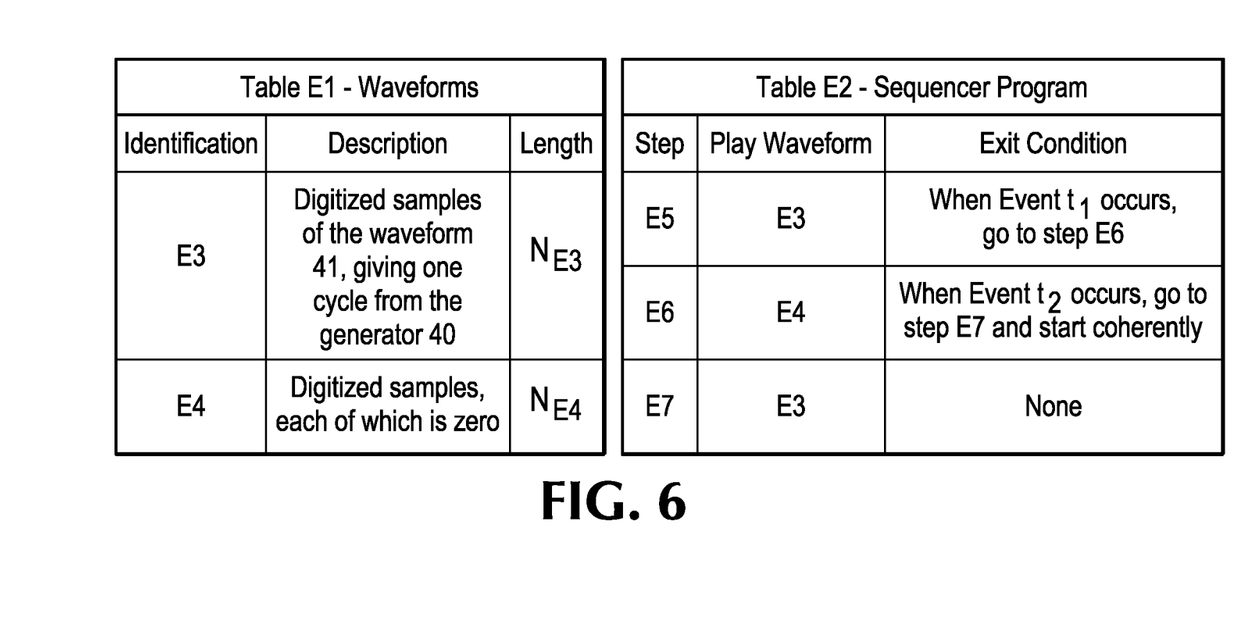
FIG. 6 is a table view of the operation of the AWG of FIG. 5 according to the present invention.

It is desired to use the AWG 10 of FIG. 5 to generate the output response illustrated in FIG. 4 in response to events input to the sequencer 20. The tables of FIG. 6 show a method for doing so. Table E1 shows two waveforms, E3 and E4, which are stored in the waveform memory 12, while table E2 shows a program to control the behavior of the sequencer 20. The waveform E3 corresponds to the output of the signal generator 40 of FIG. 3, while the waveform E4 corresponds to the output of the zero volt reference level source 46. By continuously looping through each of the stored waveforms, the output from the waveform playout 16 is either a continuous sine wave or a zero voltage level. The program for the sequencer 20 has three steps, E5, E6, E7. At step E5 the sequencer 20 instructs the waveform playout 16 to play waveform E3. This step remains in effect until an event at time t1 in FIG. 3. At time t1 the sequencer 20 instructs the waveform playout 16 to play waveform E4 until another event at time t2 causes the sequencer to instruct the waveform playout to again play waveform E3 as described below, i.e., starting phase coherently.

The operation of starting phase coherently is achieved by the sequencer 20 sending an appropriate waveform starting position indicator 22 to the waveform playout 16. As a result of the waveform starting position indicator 22, in step E7 the waveform playout 16 does not start playback of the waveform E3 at its beginning, but instead the waveform playout starts playback of waveform E3 in such a way that the graph of the output in FIG. 3 matches the graph of the signal generator 40 output after time t2.

In order for the sequencer 20 to support the operation of re-starting a waveform phase coherently, as described above, the sequencer requires some means for computing an appropriate value of the waveform starting position indicator 22. The output of the signal generator 40 of FIG. 3, or the waveform E3, may be represented mathematically by a function h1 of time:

$$h1(t) = A \cos(2\pi F t + \theta)$$

where A, F and θ are numerical values chosen according to the characteristics of the signal generator 40. The effect is to switch between the waveform h1(t) and a different function h2(t) of time, where h(2)=0. At the moment t2 the output is switched from waveform h2 back to h1, where the desired output is h1(t2) rather than h1(0). The quantity $2\pi F t + \theta$ is called the "phase", and the value of h1 at time t2 is substituted by the sequencer 20 rather than another value, such as t=0. This is the origin of the term "phase coherent."

Figure 7:
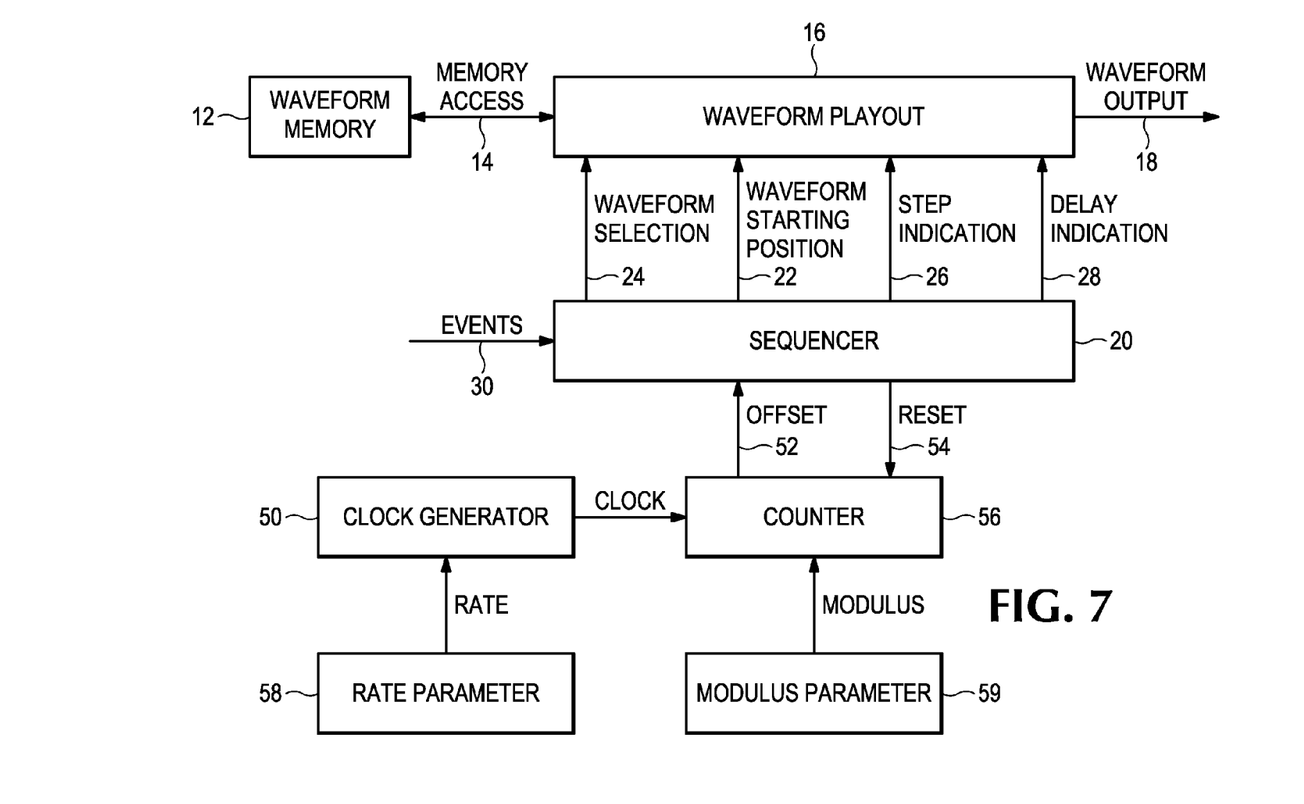
FIG. 7 is a block diagram view of the AWG of FIG. 5 including means for tracking sample position within a stored waveform according to the present invention.

Therefore the sequencer 20 has to "track the phase", i.e., be able to provide a starting position that corresponds to the desired phase at h1(t2). FIG. 7 provides a complete block diagram of the AWG 10 according to the present invention in which a means for tracking the phase is added to the sequencer 20. An offset input 52 and a reset output 54 are added to the sequencer 20. The sequencer 20 references the offset input 52 when the sequencer intends to start playing a waveform coherently. In order to provide phase coherent playout, conceptually a sample position travels through the waveform E3 over and over again, looping back to the beginning of the waveform whenever it reaches the end. The sample position indicates the position from which the waveform playout 16 obtains output sample points, and the position travels through the waveform as a function of elapsed time.

At time t1 of FIG. 3 the waveform playout 16 starts playing a constant level at zero volts. To achieve a phase coherent output at time t2 when the waveform playout 16 switches back to waveform E3, it is as though the waveform E3 continued to play without letting the waveform get to the output, i.e., the sample position in waveform E3 maintains a notion of what that waveform would be if it were playing, and enables the waveform playout 16 to start phase coherently at time t2. The function of the offset input 52 is to track the sample position, even though the waveform is not necessarily playing out at all times. The desired behavior of the offset input 52 is that it should start at the beginning of the waveform, move through the waveform at the output sample rate, R, and loop back to the beginning whenever it reaches the end of the waveform.

A clock generator 50, a counter 56, a rate parameter source 58 and a modulus parameter source 59 together create the desired behavior of the offset input 52. The counter 56 holds a value whose meaning is the sample position that travels through the waveform. The clock generator 50 applies its clock output to the counter 56 in order to increment the counter. The rate parameter source 58 is adjusted to apply the output sample rate R to the clock generator 50 so that the counter 56 increments at the output sample rate R. To achieve looping through the waveform, the modulus source 59 applies a modulus to the counter 56 so that, whenever the counter reaches the modulus, the counter returns to zero. As a result the counter 56 counts from 0 to (modulus−1) and then repeats. The modulus parameter source 59 is set to the number of data points in the stored waveform. Thus the behavior of the counter 56 is just what is needed to represent the conceptual sample position that loops back to the beginning of the waveform when it reaches the end of the waveform.

When the sequencer 20 asserts the reset signal to the counter 56, the counter is reset to zero, which has the effect of moving the concpetual sample position to the beginning of the stored waveform, i.e., the reset signal establishes a point in time at which the sample position is at the beginning of the stored waveform. The reset signal is asserted at the beginning of the execution of the sequencer program, as shown in the Table E2 of FIG. 6. The sequencer 20 may assert the reset signal at other times when it is desired to reposition the sample position, as determined by the sequencer program.

To start playing a waveform phase coherently, the rate parameter source 58 is set to the output sample rate, R, and the modulus parameter source 59 is set to the data length of the stored waveform. The sequencer 20 asserts the reset signal at a moment when the sample position within the waveform should be aligned to zero, such as at the beginning of a sequencer program. Then, when the sequencer 20 desires to switch back to the waveform and start its playback coherently, the sequencer consults the offset input 52 to determine the current conceptual sample position of the waveform. The sequencer 20 uses this information, together with the value of the delay indication 28 that the sequencer intends to apply to the waveform playout 16, to determine the appropriate value of the waveform starting position indicator 22 to use when the sequencer asserts the step indication 26.

More specifically, if the sequencer 20 intends to assert the step indication 26 at a time that is Tstep after the moment the sequencer samples the offset input 52, if the sequencer intends to send Tdelay as the value of the delay indication 28 along with the step indication, if the value sampled for the offset input is Noffset, if the output sample rate is R, and if the data length of the stored waveform to be started phase coherently is Nwfmlength, then the appropriate value of the waveform starting position indicator 22 is computed as (*N*offset+round((*T*step+*T*delay)\**R*))mod *Nwfm*length The design of a high speed counter, such as counter 56, in a modern digital system may use a variety of implementation techniques, such as pipelining, that are well known to those skilled in the art.

The essence of the present invention is that the sequencer 20 keeps track of conceptual sample position that loops through the samples of a stored waveform, by means of the modulo counter 56, and uses this information to choose the sample position within the stored waveform at which the waveform's playback starts phase coherently. The sequencer 20 may use a multiplicity of counters 56 to track the sample positions of a multiplicity of waveforms. The sequencer 20 may control a multiplicity of waveform playouts 16, thereby achieving phase coherency between waveforms that are played out on different channels of the AWG 10. Two sequencers 20 may share the use of a single counter 56 to establish a common notion of the conceptual sample position of the stored waveform, thereby achieving phase coherence between waveforms that are played out on different channels of the AWG 10.

Figure 8:
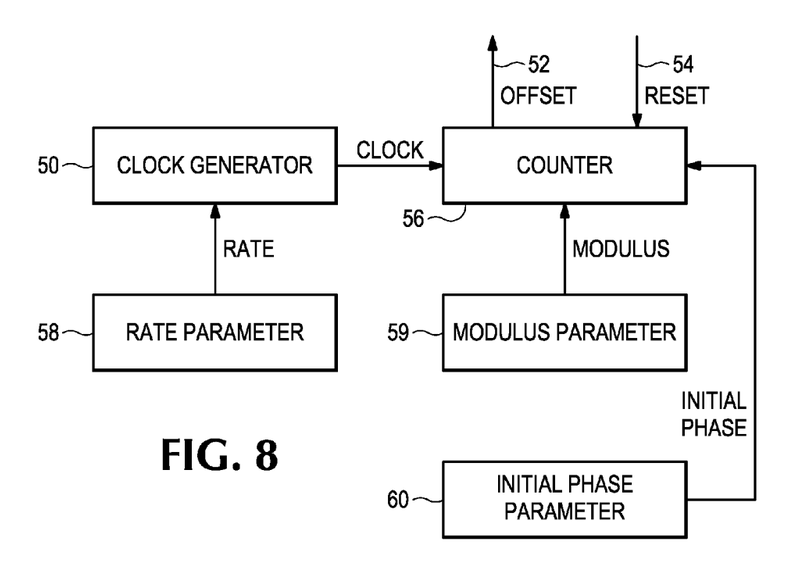
FIG. 8 is a block diagram view of a portion of the AWG of FIG. 7 illustrating setting of initial phase according to the present invention.

Referring now to FIG. 8, an extension to FIG. 7 is shown, to with the addition of an initial phase parameter source 60.

The behavior of the counter 56 is altered such that, when the reset input is asserted by the sequencer 20 to the counter, the counter does not reset to zero, but rather loads the initial phase from the initial phase parameter source 60 instead. In this way the waveform is aligned to the sample given by the initial phase parameter instead of to the beginning of the stored waveform.

Figure 9:
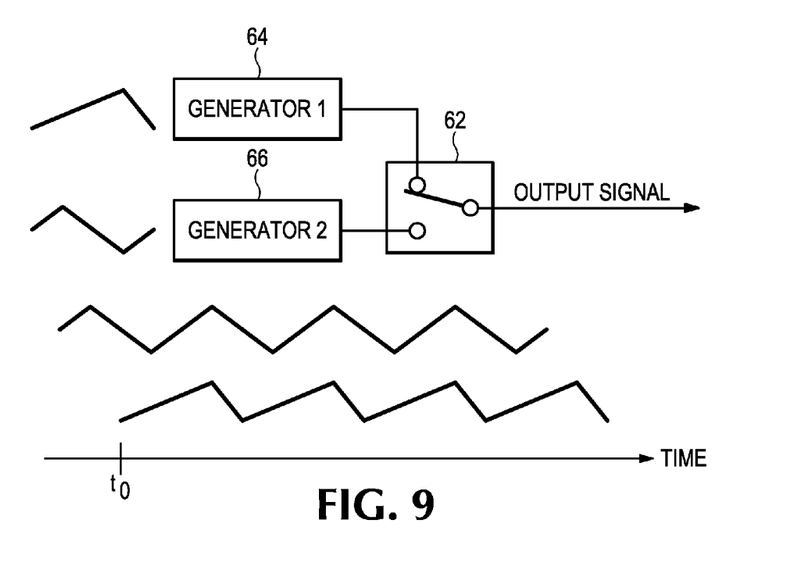
FIG. 9 is a block/waveform diagram view illustrating utility of the initial phase setting mechanism of FIG. 8 according to the present invention.

FIG. 9 illustrates the utility of the initial phase parameter. The problem is to use the AWG 10 to simulate an output signal that is switched by a switch 62 between two signal generators 64, 66. The first signal generator 64 plays a triangular waveform, as illustrated, while the second signal generator 66 plays a different triangular waveform, as illustrated. The two signal generators 64, 66 are not aligned in time, rather the output of the first generator 64 is related to the output of the second generator 66 as shown in the associated graphs of FIG. 9. The first generator 64 reaches the beginning of its waveform at a different moment in time than that at which the second generator 66 reaches the beginning of its waveform. To solve this problem the sequencer 20 uses two counters 56 with an initial phase parameter. The first counter 56 is associated with the playout of the first waveform, and the second counter is associated with the playout of the second waveform. The sequencer 20 asserts the reset input to both counters at the same time. If the initial phase parameter for the first counter 56 is zero, then the initial phase parameter for the second counter is chosen to achieve the alignment of both waveforms at a specific time, t0. As a result, the two counters 56 maintain the alignment of the two waveforms as shown in FIG. 9, as the sequencer 20 uses the technique shown in FIG. 7 to simulate switching of the switch 62 between the two generators 64, 66.

Figure 10:
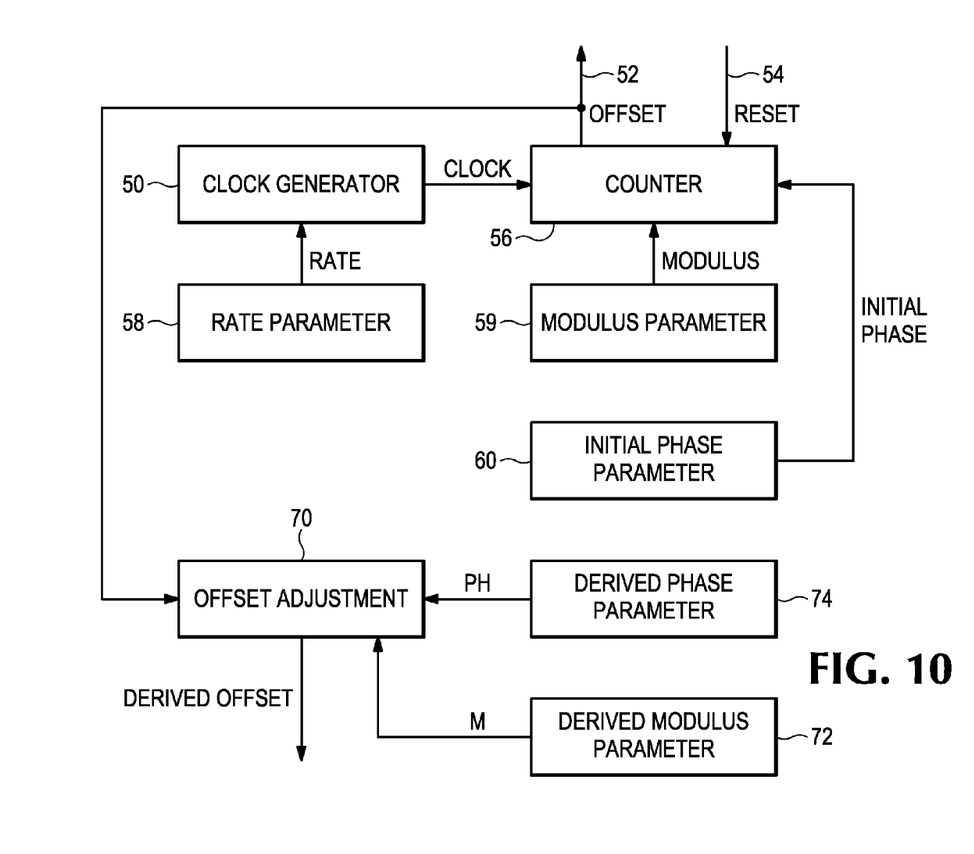
FIG. 10 is a block diagram view illustrating an extension of FIG. 8 for using a single counter for tracking phase coherency of multiple waveforms according to the present invention.

Another extension of the present invention is shown in FIG. 10. The offset input 52 is coupled to an offset adjustment source 70, which produces a derived offset output. The derived offset output is a conceptual sample position for a second stored waveform in order to keep track of the sample position of two different stored waveforms using only a single counter 56. For this technique, the second stored waveform has a length that evenly divides the modulus parameter. The length, M2, of the second stored waveform is stored in a derived modulus parameter source 72, while the length, M1, of the first stored waveform is stored in the modulus parameter source 59. The sample position of the second stored waveform travels through that waveform multiple Nderived times as the offset input 52 travels once though its range, where Nderived is $$N\text{derived} = (M1/M2)$$

Therefore the sample position of the second waveform may be obtained as:

$$(\text{Offset})/M2$$

And the number so calculated travels from zero to M2−1, repeating this loop Nderived times as the offset input travels once through its range.

It might be desirable to establish a more general relationship in time between the first and second stored waveforms, so the offset adjustment source 70 also accepts as an input a phase, PH, from a derived phase parameter source 74, which is a number between 0 and M−1 inclusive. The offset adjustment source 70 computes the derived offset as:

$$(\text{Derived Offset}) = (\text{Offset} \bmod M) + PH$$

As shown in FIG. 10, a single counter 56 keeps track of the sample positions of two different stored waveforms, provided that the data length of the second stored waveform evenly divides the data length of the first stored waveform. This concept may be extended to keep track of the sample positions of a multiplicity of different stored waveforms, provided that the data length of each derived stored waveform evenly divides the data length of the first stored waveform. For multiple stored waveforms the offset adjustment source 70, derived modulus parameter source 72 and derived phase parameter source 74 occur once for each derived stored waveform.

Thus the present invention provides an arbitrary waveform generator that produces phase coherent waveforms when switching back to a prior waveform by tracking sample position within the prior waveform when the waveform is not being played out.

What is claimed is:

1. An arbitrary waveform generator of the type having a waveform memory for storing data samples representing multiple waveforms, a waveform playout for playing out the multiple waveforms from the waveform memory as analog waveforms, and a sequencer for controlling the waveform playout by providing a waveform selection indication, a step indication and a delay indication so the waveform playout plays out a selected one of the multiple waveforms from the waveform memory according to a desired event, comprising:
    a clock generator for providing a clock signal at a desired playout rate;
    a counter having as inputs the clock signal from the clock generator and a modulus representing a number of data samples for the selected one of the multiple waveforms, the counter continuously counting pulses of the clock signal from zero to (modulus−1) to produce an offset signal to the sequencer that tracks a data sample position within the selected one of the multiple waveforms, the sequencer generating a waveform starting position indication from the offset signal when the selected one of the multiple waveforms is played out by the waveform playout according to the desired event;
    an offset adjustment source having as inputs the offset signal from the counter and a second modulus representing a second number of data samples for a second selected one of the multiple waveforms, where the second modulus is evenly divisible into the modulus for the selected one of the multiple waveforms, to produce an adjusted offset signal for allowing the second selected one of the multiple waveforms to be phase coherent when played out by the waveform playout according to a second desired event.

2. The improved arbitrary waveform generator as recited in claim 1 wherein the sequencer provides a reset signal to the counter to set the data sample position to a first data sample for the selected one of the multiple waveforms.

3. The improved arbitrary waveform generator as recited in claim 1, further comprising an initial phase parameter input to the counter to set the counter to a desired data sample position within the selected one of the multiple waveforms when the sequencer provides a reset signal to the counter.

4. A method of playing out a selected waveform from among a plurality of waveforms stored as sets of data samples in a memory for display as an analog waveform so that the selected waveform is displayed phase coherently after interruption, the method comprising:
    starting playout of the selected waveform at a desired sample rate from a selected starting position within the set of data samples corresponding to the selected waveform in response to a first event;
    interrupting the playout of the selected waveform in response to a second event for a period of time;

tracking a data sample position within the set of data samples for the selected waveform at the data sample rate during the period of time;

continuing playout of the selected waveform at the data sample rate from the data sample position in the set of data samples determined by the tracking step at a time determined by a third event which ends the period of time so the playout of the selected waveform is phase coherent; and tracking a second data sample position within the set of data samples for a second waveform, wherein the second one of the waveforms has a length in data samples that evenly divides into the length of the data samples for the selected one of the waveforms.

5. The method as recited in claim 4 wherein the selected starting position is a first data sample within the set of data samples for the selected waveform.

6. The method as recited in claim 4 wherein the selected starting position is a data sample within the set of data samples for the selected waveform determined by an initial phase parameter.

7. The method as recited in claim 4, further comprising providing a phase parameter to establish a phase differential between the selected and second ones of the waveforms.

* * * * *